US012658138B2

(12) United States Patent
Moon et al.

(10) Patent No.: US 12,658,138 B2
(45) Date of Patent: Jun. 16, 2026

(54) PIXEL CIRCUIT AND DISPLAY DEVICE INCLUDING SAME

(71) Applicant: Samsung Display Co., Ltd., Yongin-si (KR)

(72) Inventors: Seunghyun Moon, Yongin-si (KR); Gun Hee Kim, Yongin-si (KR); Jae-Kyoung Kim, Yongin-si (KR); Gyeong-Ub Moon, Yongin-si (KR); Hyoungwook Jang, Yongin-si (KR); Kangbin Jo, Yongin-si (KR); Goeun Cha, Yongin-si (KR); Boram Choi, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/227,331

(22) Filed: Jun. 3, 2025

(65) Prior Publication Data

US 2026/0112312 A1 Apr. 23, 2026

(30) Foreign Application Priority Data

Oct. 18, 2024 (KR) ........................ 10-2024-0143364

(51) Int. Cl.
*G09G 3/3233* (2016.01)

(52) U.S. Cl.
CPC ....... *G09G 3/3233* (2013.01); *G09G 2310/08* (2013.01); *G09G 2320/0242* (2013.01); *G09G 2330/021* (2013.01)

(58) Field of Classification Search
CPC ...... G09G 3/3233; G09G 3/32; G09G 3/3208; G09G 3/3225
See application file for complete search history.

(56) References Cited

U.S. PATENT DOCUMENTS 7,773,056 B2 * 8/2010 Kwak .................. G09G 3/3233 345/82
11,935,456 B2 * 3/2024 Kim .......................... G09G 3/32
2021/0210707 A1 7/2021 Levermore
2025/0246138 A1 * 7/2025 Kim .......................... G09G 3/32

FOREIGN PATENT DOCUMENTS

KR 10-2023-0049621 A 4/2023

* cited by examiner

*Primary Examiner* — Kevin M Nguyen
(74) *Attorney, Agent, or Firm* — Womble Bond Dickinson (US) LLP

(57) ABSTRACT

A pixel circuit includes a first circuit and a second circuit, in which the second circuit includes a first transistor including a gate electrode connected to a third node, a first electrode connected to the first node, and a second electrode connected to the second node, a second transistor including a gate electrode connected to the third node, a first electrode connected to the second node, and a second electrode configured to receive the first supply voltage, a third transistor including a gate electrode configured to receive a first gate signal, a first electrode configured to receive a selection signal, and a second electrode connected to the third node, and a first capacitor including a first electrode configured to receive a second supply voltage and a second electrode connected to the third node.

20 Claims, 10 Drawing Sheets

PIXEL CIRCUIT AND DISPLAY DEVICE INCLUDING SAME

CROSS-REFERENCE TO RELATED APPLICATION

The present application claims priority to and the benefit of Korean Patent Application No. 10-2024-0143364, filed on Oct. 18, 2024, in the Korean Intellectual Property Office, the entire disclosure of which is incorporated herein by reference.

BACKGROUND

1. Field

Aspects of some embodiments of the present disclosure relate to a pixel circuit and a display device including the same.

2. Description of the Related Art

A plurality of pixels included in a display panel may each include one or more light-emitting elements. Each of the plurality of pixels may output different colors of light from a plurality of light-emitting elements having different colors.

The use of light-emitting elements that emit colors of light having high color purity and light-emitting elements that emit colors of light having high luminous efficiency within a pixel has recently attracted a large amount of attention because the power consumption of display panels may be relatively reduced.

However, because a pixel driving circuit may be configured to control the emission of each light-emitting element, there may be problems, such as increasing the required space, increasing the number of IC channels, and increasing power consumption.

The above information disclosed in this Background section is only for enhancement of understanding of the background and therefore the information discussed in this Background section does not necessarily constitute prior art.

SUMMARY

Aspects of some embodiments of the present disclosure are directed to provide a pixel circuit, a display device including the same, and an electronic device including the same. The characteristics of embodiments according to the present disclosure are not limited to the above description, and other characteristics and features not explicitly disclosed herein will be clearly understood from the following description, and will be understood more clearly according to some embodiments of the present disclosure. It will also be appreciated that the above and other objectives and advantages of the present disclosure may be realized by means disclosed in the claims and combinations thereof.

In order to realize the above-described objective, a first aspect of the present disclosure provides a pixel circuit including: a first circuit including a first light-emitting element, a second light-emitting element, one or more transistors including a driving transistor, and one or more capacitors; and a second circuit including a first transistor, a second transistor, a third transistor, and a first capacitor, wherein the first light-emitting element includes a first electrode connected to the driving transistor at a first node and a second electrode connected to a second node, the second light-emitting element includes a first electrode connected to the second node and a second electrode configured to receive a first supply voltage, and the second circuit includes: the first transistor including a gate electrode connected to a third node, a first electrode connected to the first node, and a second electrode connected to the second node; the second transistor including a gate electrode connected to the third node, a first electrode connected to the second node, and a second electrode configured to receive the first supply voltage; the third transistor including a gate electrode configured to receive a first gate signal, a first electrode configured to receive a selection signal, and a second electrode connected to the third node; and a first capacitor including a first electrode configured to receive a second supply voltage and a second electrode connected to the third node.

According to the first aspect, the third transistor may transfer the selection signal to at least one of the first transistor and the second transistor based on being turned on.

According to the first aspect, of the first transistor and the second transistor, at least a first one may be a P-channel metal oxide semiconductor (PMOS) transistor, and at least a second one may be an N-channel metal oxide semiconductor (NMOS) transistor.

According to the first aspect, the first capacitor may receive the selection signal based on the third transistor being turned on and store the selection signal for a single frame.

According to the first aspect, the first light-emitting element may emit light based on the first transistor being turned off.

According to the first aspect, the second light-emitting element may emit light based on the second transistor being turned off.

According to the first aspect, the third transistor may receive the selection signal from the same line as a data signal.

According to the first aspect, the third transistor may receive the selection signal before the data signal.

According to the first aspect, the third transistor may be turned off based on the first gate signal when receiving the data signal.

According to the first aspect, the first circuit may further include a data write transistor configured to receive the data signal and including a gate electrode configured to receive a second gate signal.

A second aspect of the present disclosure provides a display device including: a scan driver configured to transfer a plurality of scan signals to a plurality of scan lines; a data driver configured to transfer a plurality of data signals to a plurality of data lines; a display including a plurality of pixels each connected to a corresponding scan line of the plurality of scan lines and a corresponding data line of the plurality of data lines, and configured to display an image with each of the plurality of pixels emitting light in accordance with a corresponding data signal; and a controller configured to control the scan driver and the data driver, generate the plurality of data signals, and supply the plurality of data signals to the data driver, wherein each of the plurality of pixels includes: a first circuit including a first light-emitting element, a second light-emitting element, one or more transistors including a driving transistor, and one or more capacitors; and a second circuit including a first transistor, a second transistor, a third transistor, and a first capacitor, wherein the first light-emitting element includes a first electrode connected to the driving transistor at a first node and a second electrode connected to a second node, the second light-emitting element includes a first electrode connected to the second node and a second electrode configured to receive a first supply voltage, and the second circuit includes: the first transistor including a gate electrode connected to a third node, a first electrode connected to the first node, and a second electrode connected to the second node; the second transistor including a gate electrode connected to the third node, a first electrode connected to the second node, and a second electrode configured to receive the first supply voltage; the third transistor including a gate electrode configured to receive a first gate signal, a first electrode configured to receive a selection signal, and a second electrode connected to the third node; and a first capacitor including a first electrode configured to receive a second supply voltage and a second electrode connected to the third node.

According to the second aspect, the third transistor may transfer the selection signal to at least one of the first transistor and the second transistor based on being turned on.

According to the second aspect, of the first transistor and the second transistor, at least a first one may be a P-channel metal oxide semiconductor (PMOS) transistor, and at least a second one may be an N-channel metal oxide semiconductor (NMOS) transistor.

According to the second aspect, the first capacitor may receive the selection signal based on the third transistor being turned on and store the selection signal for a single frame.

According to the second aspect, the first light-emitting element may emit light based on the first transistor being turned off.

According to the second aspect, the second light-emitting element may emit light based on the second transistor being turned off.

According to the second aspect, the third transistor may receive the selection signal from the same line as a data signal.

According to the second aspect, the third transistor may receive the selection signal before the data signal.

According to the second aspect, the third transistor may be turned off based on the first gate signal when receiving the data signal.

According to the second aspect, the first circuit may further include a data write transistor configured to receive the data signal and including a gate electrode configured to receive a second gate signal.

DETAILED DESCRIPTION

Figure 1:
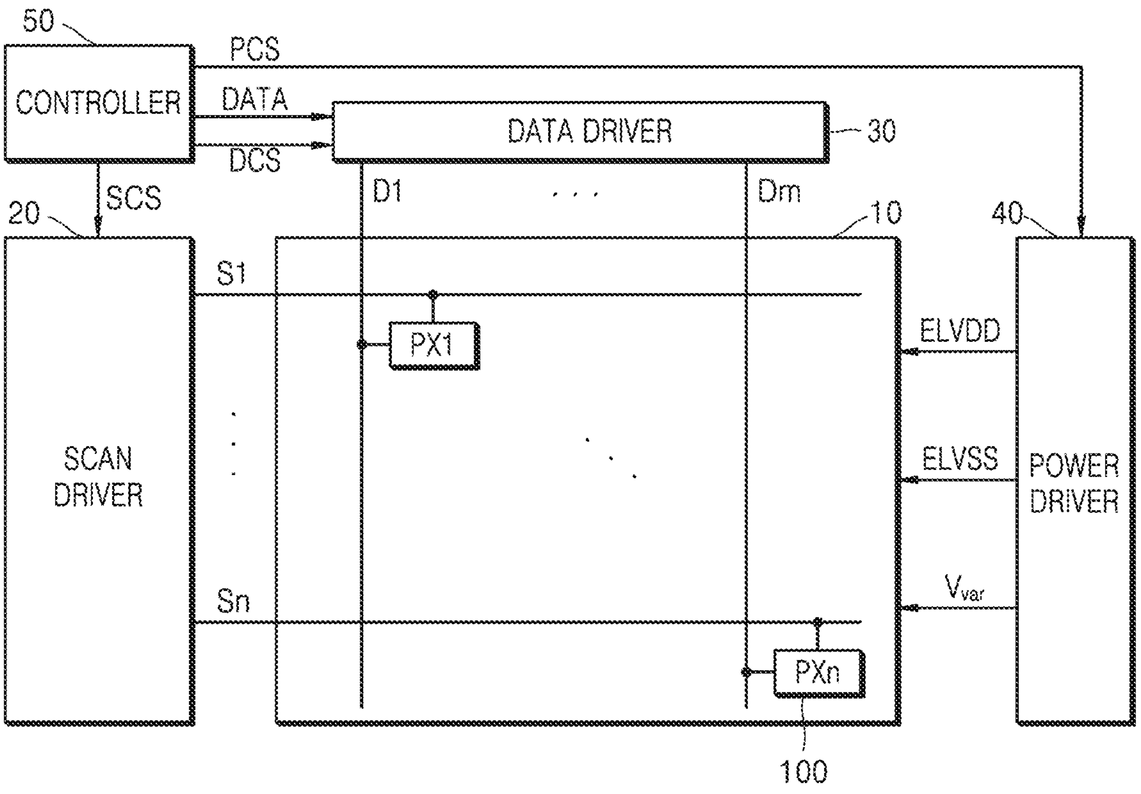
FIG. 1 is a block diagram showing a display device according to an embodiment.

The present disclosure may have various modifications and various embodiments, and thus specific embodiments are shown in the drawings and described in detail in the detailed description. The effects and features of the present disclosure and how to accomplish the same will be apparent with reference to the following detailed description together with the drawings. However, the present disclosure is not limited to embodiments disclosed below, but may be implemented in various forms.

In the following embodiments, terms, such as first and second, as used herein do not have a limited meaning but are used for the purpose of distinguishing one component from another.

In the following embodiments, singular forms include plural referents unless the context clearly indicates otherwise.

In the following embodiments, terms, such as "comprising" or "having", are intended to imply the presence of a feature or component described in the specification and do not preclude the possibility that one or more other features or components may be added.

In the following embodiments, when a portion, such as a unit, area, or component, is referred to as being above or on another portion, the portion may be directly above or on the other portion or an intervening portion, such as a unit, area, or component, may also be present between the two portions.

In the following embodiments, terms, such as "connect" or "couple", do not necessarily mean a direct and/or fixed connection or coupling of two members, unless the context clearly indicates otherwise, and do not exclude the presence of other members provided between the two members.

In the drawings, components may be exaggerated or reduced in size for ease of explanation. For example, the sizes and thicknesses of the respective components shown in the drawings are arbitrary for ease of explanation, and therefore the following embodiments are not necessarily limited thereto.

In the following embodiments, the term "on", when used in connection with the state of an element, may refer to an activated state of the element, and the term "off", when used in connection with the state of the element, may refer to a deactivated state of the element. The term "on" used in connection with a signal received by the element may refer to a signal that activates the element, and the term "off" used in connection with the signal received by the element may refer to a signal that deactivates the element. The element may be activated by a high voltage or a low voltage. For example, a P-type transistor may be activated by a low voltage. An N-type transistor may be activated by a high voltage. Thus, an "on" voltage of the P-type transistor and an "on" voltage of the N-type transistor should be interpreted as having an opposite (low to high) voltage level relationship.

In the following embodiments, when an element is referred to as being "connected to another element, the element may be interpreted as being directly connected to another element or an intervening element may be present between the two elements.

Hereinafter, example embodiments of the present disclosure will be described in detail with reference to the accompanying drawings, in which identical or corresponding components are designated by the same reference numerals and repeated descriptions thereof are omitted.

FIG. 1 is a block diagram showing a display device according to some embodiments. According to various embodiments, the display device may be incorporated into an electronic device, such as a smart phone, a tablet personal computer, a computer monitor, a television, a smartwatch, a wearable device (e.g., a virtual reality display device or an augmented reality display device), a vehicle console, and the like.

Referring to FIG. 1, a display device according to some embodiments of the present disclosure may include a display 10 including a plurality of pixels PX1 to PXn, a scan driver 20, a data driver 30, a power driver 40, and a controller 50.

According to some embodiments, each of the plurality of pixels PX1 to PXn may be connected to one or more corresponding scan lines of a plurality of scan lines S1 to Sn and one or more corresponding data lines of a plurality of data lines D1 to Dm connected to the display 10.

According to some embodiments, each of the plurality of pixels PX1 to PXn may be connected to a power supply line connected to the display 10 to receive a supply voltage ELVDD or ELVSS and a variable voltage $V_{var}$.

According to some embodiments, each of the power supply voltages ELVDD and ELVSS may have a fixed voltage value for a plurality of frames during which an image (or video) is displayed, while the variable voltage $V_{var}$ may have a variable voltage value where the voltage level varies over a period of time (e.g., a set or predetermined period of time) within a frame. According to some embodiments, the first supply voltage ELVDD may be a high level voltage (e.g., a set or predetermined high level voltage), the second supply voltage ELVSS may be a voltage lower than the first supply voltage ELVDD or may be a ground voltage, and the variable voltage $V_{var}$ may be set to a voltage value equal to or lower than the second supply voltage ELVSS over a period of time (e.g., a set or predetermined period of time).

According to some embodiments, the display 10 may include the plurality of pixels PX1 to PXn arranged in the form of a matrix. Although not particularly limited, the plurality of scan lines S1 to Sn and a plurality of emission control lines EM1 to EMn may extend in a row direction (or substantially in a row direction) to oppose and to be parallel to each other, and the plurality of data lines D1 to Dm may extend in a column direction (or substantially in a column direction) to oppose and be parallel to each other.

According to some embodiments, each of the plurality of pixels PX1 to PXn of the display 10 may be connected to two corresponding scan lines. That is, each of the plurality of pixels PX1 to PXn of the display 10 may be connected to a scan line corresponding to the pixel row including the corresponding pixel and a scan line corresponding to the previous pixel row. According to some embodiments, each of the plurality of pixels in the first pixel row may be connected to a first scan line S1 and a dummy scan line S0. Similarly, each of the plurality of pixels included in the nth pixel row may be connected to an nth scan line Sn corresponding to the nth pixel row and an (n−1)th scan line Sn−1 corresponding to the (n−1)th pixel row, which is the previous pixel row.

According to some embodiments, each of the plurality of pixels PX1 to PXn may emit a luminance of light (e.g., a set or predetermined luminance of light) using a driving current supplied to an organic light-emitting diode (OLED) in accordance with a corresponding data signal transferred through the plurality of data lines D1 to Dm.

According to some embodiments, the display 10 may be referred to as a display panel. In the present disclosure, the display panel may be implemented as one of a liquid crystal display (LCD), a light-emitting diode (LED) display, an organic LED (OLED) display, an active-matrix OLED (AMOLED) display, an electrochromic display (ECD), a digital mirror device (DMD), an actuated mirror device (AMD), a grating light valve (GLV), a plasma display panel (PDP), an electro luminescent display (ELD), and a vacuum fluorescent display (VFD), or may be implemented as any other type of flat panel display or flexible display.

According to some embodiments, the scan driver 20 may generate and transfer scan signals corresponding to the respective pixels through the plurality of scan lines S1 to Sn. That is, the scan driver 20 may transfer a scan signal through a scan line corresponding to each of the plurality of pixels included in each pixel row. According to some embodiments, the scan driver 20 may generate a plurality of scan signals by receiving a scan driving control signal SCS from the controller 50, and may sequentially supply scan signals to the plurality of scan lines S1 to Sn connected to the respective pixel rows.

According to some embodiments, the data driver 30 may transfer data signals to the respective pixels through the plurality of data lines D1 to Dm. According to some embodiments, the data driver 30 may receive a data driving control signal DCS from the controller 50 to supply data signals corresponding to the plurality of data lines D1 to Dm connected to the plurality of pixels included in the respective pixel rows, respectively.

According to some embodiments, the power driver 40 may supply the first power supply voltage ELVDD, the second power supply voltage ELVSS, and an initialization voltage Vint to each pixel of the display 10. According to some embodiments, the first power supply voltage ELVDD may be a high level voltage (e.g., a set or predetermined high level voltage), and the second power supply voltage ELVSS may be a voltage lower than the first power supply voltage ELVDD or may be a ground voltage. According to some embodiments, the initialization voltage Vint may be set to a voltage value equal to or lower than the second supply voltage ELVSS.

According to some embodiments, the voltage values of the first power supply voltage ELVDD, the second power supply voltage ELVSS, and the initialization voltage Vint are not particularly limited, but the voltage values may be set or controlled under the control of the power control signal PCS transferred by the controller 50.

According to some embodiments, the controller 50 may convert a plurality of externally transferred image signals into a plurality of image data signals DATA and transfer the plurality of image data signals DATA to the data driver 30. The controller 50 may also receive a vertical synchronization signal Vsync, a horizontal synchronization signal Hsync, and a clock signal MCLK, generate control signals for controlling the operation of the scan driver 20 and the data driver 30, and transfer the control signals to the scan driver 20 and the data driver 30, respectively. That is, the controller 50 may generate and transfer the scan driving control signal SCS to control the scan driver 20 and the data driving control signal DCS to control the data driver 30, respectively. The controller 50 may also generate and transfer the power control signal PCS to the power driver 40 to control the driving of the power driver 40.

According to some embodiments, the display device may further include a reference voltage generator. According to some embodiments, the reference voltage generator may generate a reference voltage VRef based on a control signal input from the controller 50. The reference voltage generator may provide the reference voltage VRef to the data driver 30. The reference voltage VRef may have a value corresponding to each of the data signals DATA. According to some embodiments, the reference voltage generator may be located within the controller 50 or may be located within the data driver 30.

According to some embodiments, the data driver 30 may receive the data driving control signal DCS from the controller 50 and the reference voltage VRef from the reference voltage generator. The data driver 30 may convert the data signal DATA to the data voltage VDATA having an analog format using the reference voltage VRef. According to some embodiments, the data driver 30 may output the data voltage VDATA to a data line.

According to some embodiments, the display device may further include a light emission control driver. According to some embodiments, the light emission control driver may be connected to the plurality of light emission control lines EM1 to EMn connected to the display 10 including the plurality of pixels PX1 to PXn arranged in a matrix. That is, the plurality of light emission control lines EM1 to EMn may connect each of the plurality of pixels to the light emission control driver. According to some embodiments, the light emission control driver may receive a light emission driving control signal ECS generated by the controller 50.

According to some embodiments, the light emission control driver may generate and transfer a light emission control signal corresponding to each pixel through the plurality of light emission control lines EM1 to EMn. Each pixel that has received the light emission control signal may be controlled to emit an image in accordance with the image data signal in response to the control of the light emission control signal. That is, the operation of the light emission control transistor included in each pixel is controlled in accordance with the light emission control signal transferred through the corresponding light emission control line, and the organic light-emitting diode connected to the light emission control transistor may accordingly emit or not emit light at a luminance corresponding to the driving current corresponding to the data signal.

According to some embodiments, the display device may further include a subpixel selector. The subpixel selector may transfer selection signals to respective pixels through selection signal lines. According to some embodiments, the subpixel selector may receive selection signals from the controller 50 and supply a corresponding selection signal to each of a plurality of selection signal lines connected to the plurality of pixels included in each pixel row, respectively.

According to some embodiments, selection signals generated by the controller 50 may be transferred to the data driver 30. According to some embodiments, the data driver 30 may receive selection signals from the controller 50 and supply corresponding selection signals to the plurality of pixels included in each pixel row through the plurality of data lines D1 to Dm connected thereto.

Figure 2:
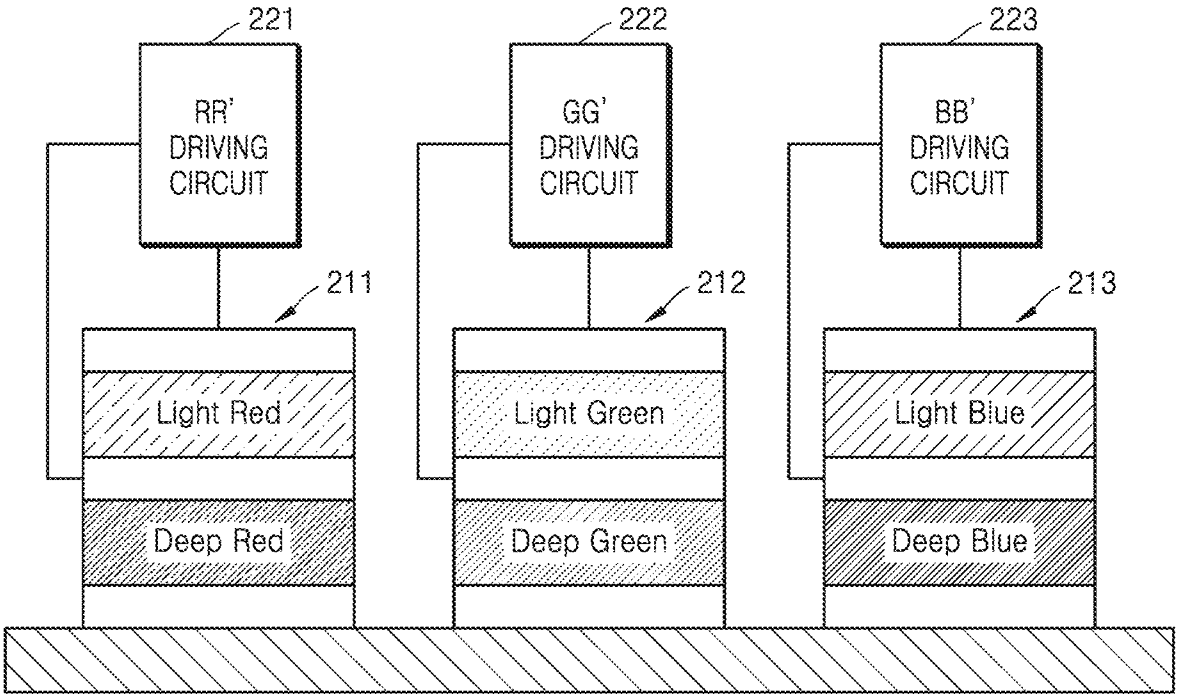
FIG. 2 is a conceptual diagram showing an example of a pixel of the display device of FIG. 2.

FIG. 2 is a conceptual diagram showing an example of a pixel of the display device of FIG. 2.

According to some embodiments, each of the plurality of pixels 100 included in the display 10 may include one or more light-emitting elements. According to some embodiments, the light-emitting element may be a light-emitting diode (LED). The light-emitting diode may be a micro LED having a size of 100 μm or less. According to some embodiments, a pixel PX may output various colors through a plurality of light-emitting elements having different colors. According to some embodiments, a pixel PX may include red (R), green (G), and blue (B) light-emitting elements. According to some embodiments, the pixel PX may further include a white light-emitting element, wherein the white light-emitting element may replace any of the red, green, and blue light-emitting elements. According to some embodiments, a pixel PX may include a white light-emitting element. According to some embodiments in which a pixel PX includes a plurality of light-emitting elements, the respective light-emitting elements included in the pixel PX may be referred to as "subpixels".

In the present disclosure, each pixel PX may include a pixel driving circuit to drive light-emitting elements, i.e., subpixels, included in the pixel. In the present disclosure, the pixel driving circuit may drive a turn on operation or a turn off operation of the subpixel by signals output from a scan driving circuit 120 and/or a data driving circuit 130. According to some embodiments, the pixel driving circuit may include at least one transistor, at least one capacitor, and the like. According to some embodiments, the pixel driving circuit may be implemented as a stacked structure on a semiconductor wafer.

Referring to FIG. 2, a pixel may include a light-emitting element 211 configured to emit red light, a light-emitting element 212 configured to emit green light, and a light-emitting element 213 configured to emit blue light. The pixel may also include pixel driving circuits 221 to 223 corrected to the respective light-emitting elements.

According to some embodiments, the light-emitting element 211 may be configured to include a light-emitting element configured to emit first red light and a light-emitting element configured to emit second red light. Here, the first red may be a red having high luminous efficiency, which may be referred to as a light red, and the second red may be a red having high color purity, which may be referred to as a deep red. The light-emitting element 212 may be configured to include a light-emitting element configured to emit first green light and a light-emitting element configured to emit second green light. Here, the first green may be a green having high luminous efficiency, which may be referred to as a light green, and the second green may be a green having high color purity, which may be referred to as a deep green. The light-emitting element 213 may be configured to include a light-emitting element configured to emit first blue light and a light-emitting element configured to emit second blue light. Here, the first blue may be a blue having high luminous efficiency, which may be referred to as a light blue, and the second blue may be a blue having high color purity, which may be referred to as a deep blue.

For example, a light-emitting element configured to emit a light color may be used when emitting a general color of light, and a light-emitting element configured to emit a deep color may be used when color reproduction is important. When a combination of the light color and the deep color is used efficiently, power consumption may be relatively reduced.

As shown in FIG. 2, in the pixel according to some embodiments of the present disclosure, a light-emitting element configured to emit a light color and a light-emitting element configured to emit a high purity color may be controlled by a driving circuit. According to some embodiments, the pixel driving circuits 221 to 223 may selectively emit any of the first red light and the second red light when emitting a color (e.g., red). As a result, the pixel circuits according to some embodiments of the present disclosure may relatively reduce a required space compared to circuits that require a driving circuit to be connected to each light-emitting element.

Figure 3:
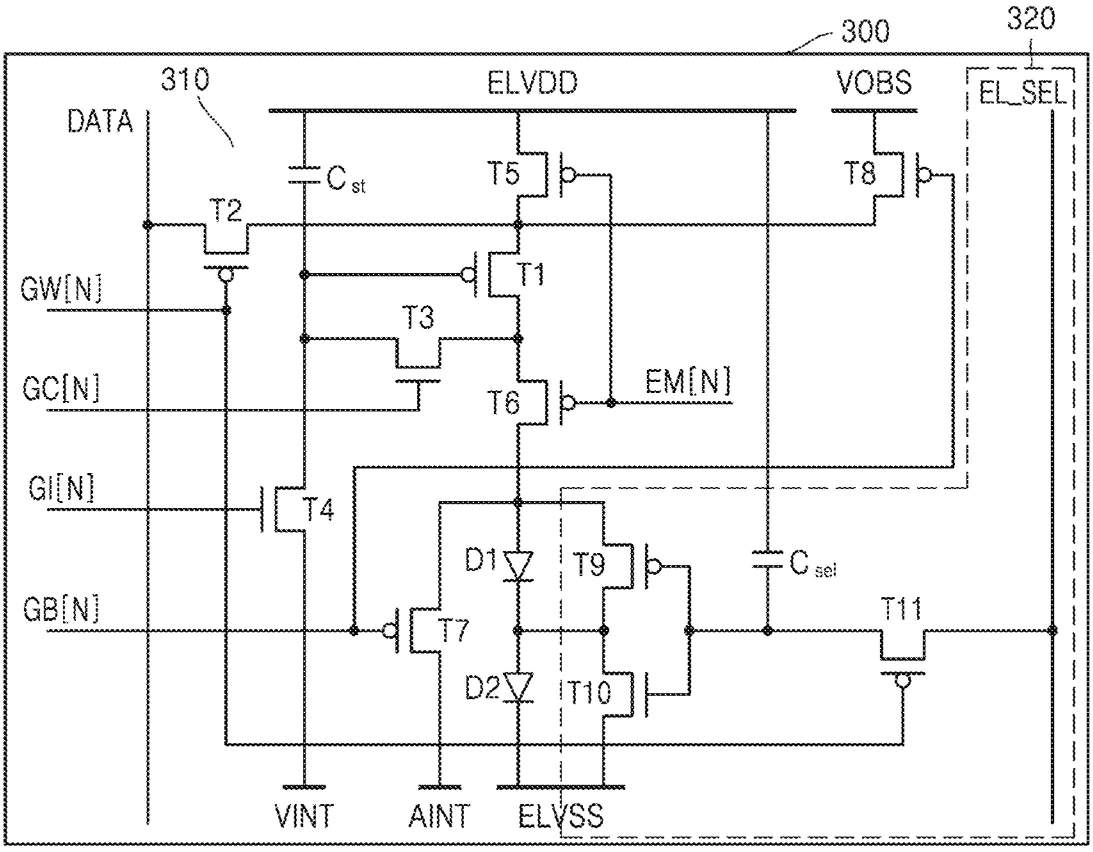
FIG. 3 is a circuit diagram showing a pixel circuit according to some embodiments of the present disclosure.

FIG. 3 is a circuit diagram showing a pixel circuit according to some embodiments of the present disclosure. Although FIG. 3 illustrates various components in a pixel circuit according to some embodiments, embodiments according to the present disclosure are not limited thereto, and according to various embodiments, the pixel circuit may include additional components or fewer components without departing from the spirit and scope of embodiments according to the present disclosure.

Referring now to FIG. 3, a pixel circuit 300 according to some embodiments of the present disclosure may include a first circuit 310 and a second circuit 320.

In the present disclosure, the first circuit 310 may refer to a circuit that drives a display device using an organic light-emitting diode.

According to some embodiments, the first circuit 310 may be implemented as an 8T1C circuit including a storage capacitor Cst in which a data voltage DATA is stored, a driving transistor T1 configured to generate a driving current based on the data voltage DATA, and a data write transistor T2 configured to receive the data voltage DATA, as shown in FIG. 3.

According to some embodiments, the first circuit 310 may receive a plurality of gate signals GW, GC, GI, and GB and the data voltage DATA as inputs, and may cause a light-emitting element to emit light according to the level of the data voltage DATA to display an image.

According to some embodiments, the transistors included in the first circuit 310 may be implemented as an N-channel metal oxide semiconductor (NMOS) transistor or a P-channel metal oxide semiconductor (PMOS) transistor, depending on the design of the circuit. According to some embodiments, of the transistors included in the first circuit 310, the transistor implemented as an NMOS transistor may be turned on based on a high level signal, and the transistor implemented as a PMOS transistor may be turned off based on a low level signal.

According to some embodiments, the first circuit 310 may include a first light-emitting element D1 and a second light-emitting element D2. According to some embodiments, at least a first one of the first light-emitting element D1 and the second light-emitting element D2 may be a light-emitting element configured to emit a deep color (described herein as a first color for ease of description), and at least a second one of the second light-emitting element may be a light-emitting element configured to emit a light color (described herein as a second color for ease of description). According to some embodiments, when the first light-emitting element D1 is a light-emitting element configured to emit a deep blue, the second light-emitting element D2 may be a light-emitting element configured to emit a light blue. According to some embodiments, when the first light-emitting element D1 is a light-emitting element configured to emit a light red, the second light-emitting element D2 may be a light-emitting element configured to emit a deep red.

According to some embodiments, the first light-emitting element D1 may include a first electrode connected to a first node N1 and a second electrode connected to a second node N2. According to some embodiments, the first light-emitting element D1 may be connected to a driving transistor T1 at the first node N1.

The second light-emitting element D2 may include a first electrode connected to the second node N2 and a second electrode connected to a supply voltage ELVSS. According to some embodiments, the first light-emitting element D1 and the second light-emitting element D2 may be connected to each other at the second node N2.

In the present disclosure, the first circuit 310 is not limited to the circuit shown in FIG. 3. As described above, a pixel circuit configured to drive a display device using organic light-emitting diodes may be included in the first circuit 310 if the pixel circuit includes a light-emitting element configured to emit a first color and a light-emitting element configured to emit a second color. Therefore, the connection relationship between the elements in the first circuit 310 shown in FIG. 3, the gate signal, the type of the transistor configured to receive the gate signal, and the like correspond to some embodiments.

Referring again to FIG. 3, the second circuit 320 may be connected to the first circuit 310. When the first circuit 310 is referred to as a circuit that controls the supply of the driving current to the light-emitting elements, the second circuit 320 may be referred to as a circuit that selects one light-emitting element among the light-emitting elements included in the first circuit 310 so that the driving current is supplied to the selected light-emitting element. In another aspect, the second circuit 320 may be referred to as a selection circuit or an additional circuit.

According to some embodiments, the second circuit 320 may include: a first transistor T9 including a gate electrode connected to a third node N3, a first electrode connected to the first node N1, and a second electrode connected to the second node N2; a second transistor T10 including a gate electrode connected to the third node N3, a first electrode connected to the second node N2, and a second electrode configured to receive the first supply voltage ELVSS; a third transistor T11 including a gate electrode configured to receive a first gate signal GW, a first electrode configured to receive a select signal EL_SEL, and a second electrode connected to the third node N3; and a first capacitor $C_{sel}$ including a first electrode configured to receive a second supply voltage ELVDD and a second electrode connected to the third node N3.

Referring to FIG. 3, the first transistor T9 may include a gate electrode connected to the third node N3, a first electrode connected to the first node N1, and a second electrode connected to the second node N2.

According to some embodiments, the first transistor T9 may be connected to the first electrode of the first light-emitting element D1 at the first node N1, and may be connected to the second electrode of the first light-emitting element D1 at the second node N2. According to some embodiments, when the first transistor T9 is turned on, there may be no voltage difference between the first electrode and the second electrode of the first light-emitting element D1, so that the first light-emitting element D1 may not be supplied with the driving current. According to some embodiments, when the first transistor T9 is turned off, the driving current supplied from the driving transistor T1 may be supplied to the first light-emitting element D1, and the first light-emitting element D1 may emit light.

According to some embodiments, the first transistor T9 may be connected to the first electrode of the second light-emitting element D2 at the second node N2. According to some embodiments, when the first transistor T9 is turned on, the driving current supplied from the driving transistor T1 may be transferred to the second light-emitting element D2 through the first transistor T9.

According to some embodiments, the first transistor T9 may be connected to the third transistor T11 at the third node N3. As will be described later, the first transistor T9 may receive a selection signal from the third transistor T11.

Referring again to FIG. 3, the second transistor T10 may include a gate electrode connected to the third node N3, a first electrode connected to the second node N2, and a second electrode configured to receive the first supply voltage ELVSS.

According to some embodiments, the second transistor T10 may be connected to the first electrode of the second light-emitting element D2 at the second node N2, and may receive the power supply voltage ELVSS equal to the power supply voltage connected to the second electrode of the second light-emitting element D2. According to some embodiments, when the second transistor T10 is turned on, there may be no voltage difference between the first electrode and the second electrode of the second light-emitting element D2, so that the second light-emitting element D2 may not be supplied with the driving current. According to some embodiments, when the second transistor T10 is turned off, the driving current may be supplied to the second light-emitting element D2, and the second light-emitting element D2 may emit light.

According to some embodiments, the second transistor T10 may be connected to the second electrode of the first light-emitting element N1 at the second node N2. According to some embodiments, the driving current may flow through the first light-emitting element N1 before being supplied to the second transistor T10.

According to some embodiments, the second transistor T10 may be connected to the third transistor T11 at the third node N3. As will be described later, the second transistor T10 may receive the selection signal from the third transistor T11.

Referring again to FIG. 3, the third transistor T11 may include a gate electrode configured to receive a first gate signal, a first electrode configured to receive a select signal, and a second electrode connected to the third node N3.

According to some embodiments, the third transistor T11 may receive a GW gate signal. As shown in FIG. 3, the GW gate signal may also be received by the data write transistor T2, which receives the data signal. The third transistor T11 and the data write transistor T2 may be turned on based on the GW gate signal. In another aspect, the third transistor T11 may be turned on or off in the same period as the data write transistor T2, so that a period in which the data is written and a period in which the light-emitting element is selected may be the same.

According to some embodiments, the third transistor T11 may receive other gate signals (e.g., GC, GI, GB) in addition to the GW gate signal. Depending on the gate signal received by the third transistor T11, the third transistor T11 may be implemented as an NMOS transistor or a PMOS transistor. In the present disclosure, when an operation period during which the third transistor T11 is turned on and transfers the selection signal EL_Sel is referred to as a selection period, the selection period may be operated before a light-emitting period during which the light-emitting element is supplied with the driving current and emits light. Accordingly, the third transistor T11 may receive a gate signal other than the light emission control signal EM.

According to some embodiments, the third transistor T11 may be connected to the first capacitor $C_{sel}$ at the third node. According to some embodiments, the third transistor T11 may transfer a selection signal EL_SEL to the first capacitor $C_{sel}$ based on being turned on.

According to some embodiments, the third transistor T11 may be connected to the gate electrode of the first light-emitting element D1 and the gate electrode of the second light-emitting element D2 at the third node. According to some embodiments, based on the third transistor T11 being turned on, the selection signal EL_SEL may be transferred to the gate electrode of the first light-emitting element D1 or the gate electrode of the second light-emitting element D2. According to some embodiments, when the select signal EL_SEL is a high-level signal, the transistor implemented as an NMOS transistor may be turned on, and the transistor implemented as a PMOS transistor may be turned off. According to some embodiments, when the select signal EL_SEL is a low-level signal, the transistor implemented as an NMOS may be turned off and the transistor implemented as a PMOS transistor may be turned on.

In the present disclosure, the first light-emitting element D1 and the second light-emitting element D2 may selectively emit light, and therefore the first transistor T9 and the second transistor T10 may be implemented as different types of transistors.

Of the first transistor T9 and the second transistor T10, at least the first one may be a PMOS transistor, and at least the second one may be an NMOS transistor. According to some embodiments, as shown in FIG. 3, when the first transistor T9 is implemented as a PMOS transistor, the second transistor T10 may be implemented as an NMOS transistor. According to some embodiments, when the first transistor T9 is implemented as an NMOS transistor, the second transistor T10 may be implemented as a PMOS transistor.

Referring again to FIG. 3, the first capacitor $C_{sel}$ may include a first electrode configured to receive the supply voltage (ELVDD) and a second electrode connected to the third node N3.

According to some embodiments, the first capacitor $C_{sel}$ may be connected to the third transistor T11 at the third node. According to some embodiments, the first capacitor $C_{sel}$ may receive a selection signal EL_SEL based on the third transistor being turned on, and may store the received selection signal EL_SEL for a single frame.

According to some embodiments, the first capacitor $C_{sel}$ may receive the supply voltage ELVSS based on the characteristics of the first transistor T9 or the second transistor T10.

Figure 4:
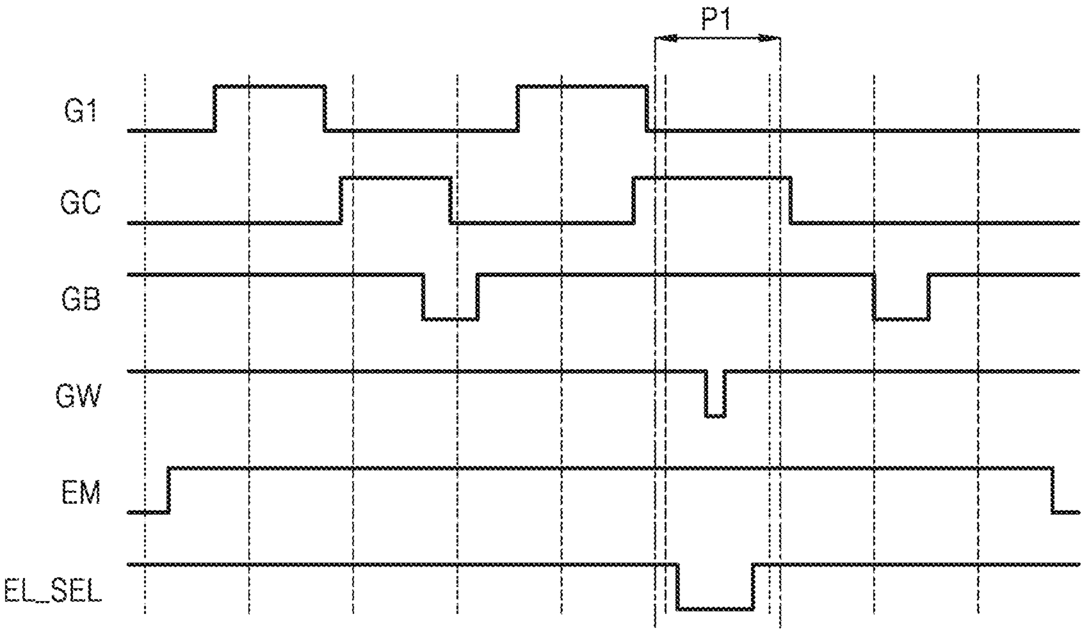
FIG. 4 is a timing diagram showing an example of input signals applied to the pixel circuit of FIG. 3.
Figure 5:
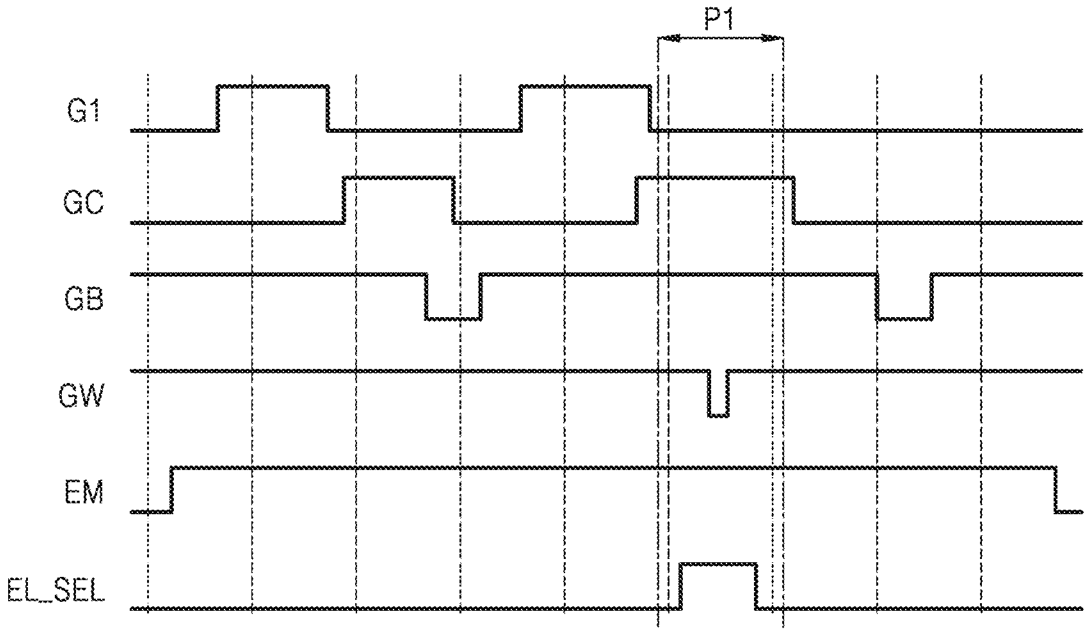
FIG. 5 is a timing diagram showing another example of input signals applied to the pixel circuit of FIG. 3.

FIG. 4 is a timing diagram showing an example of input signals applied to the pixel circuit of FIG. 3, and FIG. 5 is a timing diagram showing another example of input signals applied to the pixel circuit of FIG. 3.

In the following, the pixel circuit controlled in accordance with the input signal shown in the timing diagram of FIG. 4 or the timing diagram of FIG. 5 will be described, assuming that the first transistor T9 is implemented as a PMOS transistor and the second transistor T10 is implemented as an NMOS transistor as shown in FIG. 3.

Referring to FIG. 4, in the first period P1, the GW gate signal is shown as a low signal and the select signal EL_SEL is shown as a low signal. Based on the GW gate signal being a low signal, the third transistor T11 implemented as a PMOS transistor may be turned on. Furthermore, based on the third transistor T11 being turned on, the selection signal EL_SEL may be transferred to the third node. At this time, because the selection signal EL_SEL transferred to the third node is a low signal, the first transistor T9 implemented as a PMOS transistor may be turned on, and the second transistor T10 implemented as an NMOS transistor may be turned off. Depending on the first transistor T9 being turned on, the driving current supplied to the first node may flow to the first transistor T9 rather than to the first light-emitting element D1. Furthermore, in response to the second transistor T10 being turned off, the driving current supplied to the second node may flow to the second light-emitting element D2. That is, in the light-emitting period, the second light-emitting element D2 may emit light based on the driving current. In another aspect, the timing diagram of the input signal shown in FIG. 4 may be an example of a signal flow controlling the second light-emitting element D2 to emit light.

Referring to FIG. 5, in the second period P2, the GW gate signal is shown as a low signal and the select signal EL_SEL is shown as a high signal. Based on the GW gate signal being a low signal, the third transistor T11 implemented as a PMOS transistor may be turned on. Furthermore, based on the third transistor T11 being turned on, the selection signal EL_SEL may be transferred to the third node. At this time, because the selection signal EL_SEL transferred to the third node is a high signal, the first transistor T9 implemented as a PMOS transistor may be turned off, and the second transistor T10 implemented as an NMOS transistor may be turned on. In response to the first transistor T9 being turned off, the driving current supplied to the first node may flow to the first light-emitting element D1. Furthermore, in response to the second transistor T10 being turned on, the driving current supplied to the second node may flow to the second transistor T10 rather than the second light-emitting element D2. That is, in the light-emitting period, the first light-emitting element D1 may emit light based on the driving current. In another aspect, the timing diagram of the input signal shown in FIG. 5 may be an example of a signal flow controlling the first light-emitting element D1 to emit light.

Figure 6:
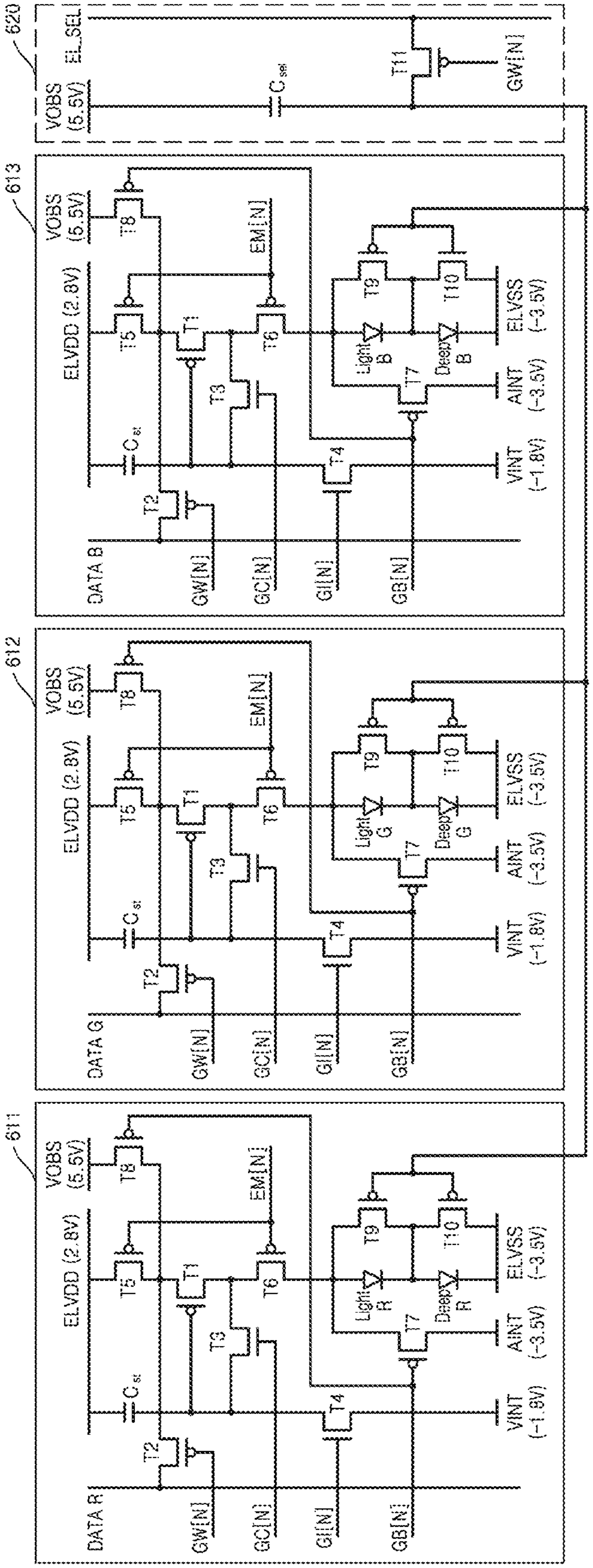
FIG. 6 is a circuit diagram showing a pixel circuit according to some embodiments of the present disclosure.
Figure 7:
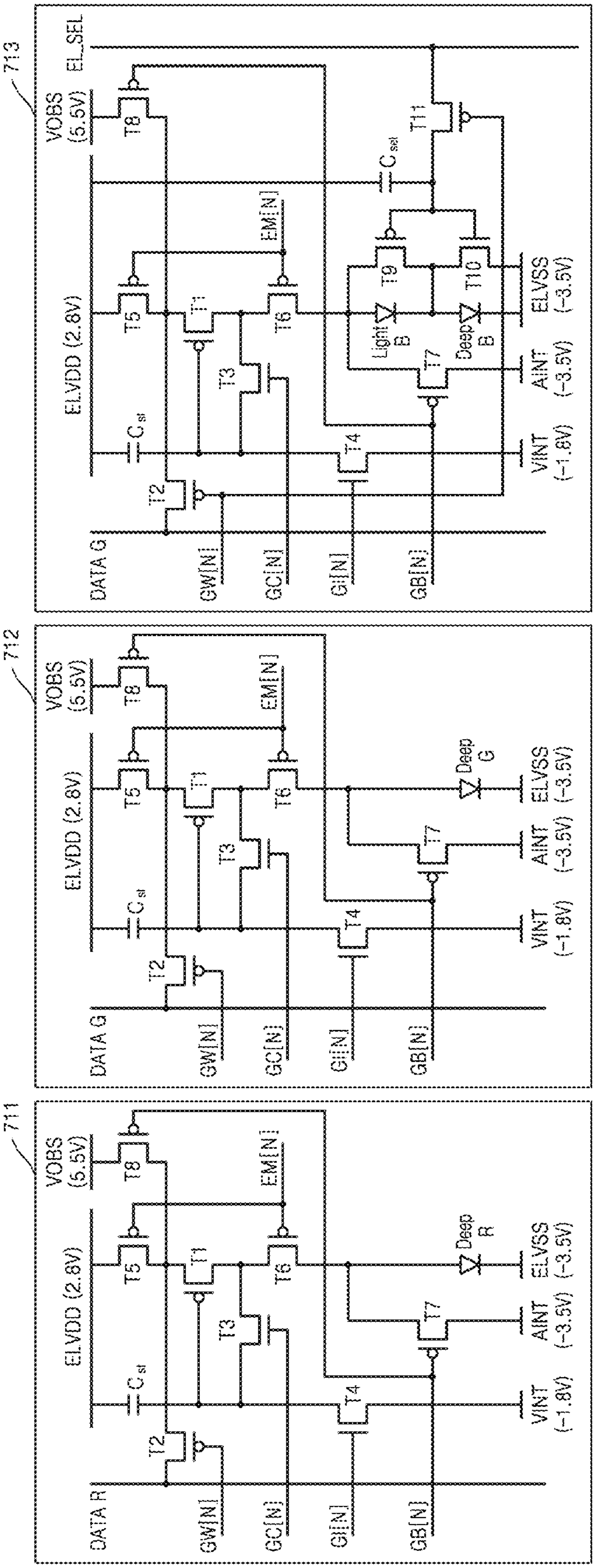
FIG. 7 is a circuit diagram showing a pixel circuit according to some embodiments of the present disclosure.

FIG. 6 is a circuit diagram showing a pixel circuit according to some embodiments of the present disclosure, and FIG. 7 is a circuit diagram showing a pixel circuit according to some embodiments of the present disclosure. Although FIGS. 6 and 7 illustrates various components in a pixel circuit according to some embodiments, embodiments according to the present disclosure are not limited thereto, and according to various embodiments, the pixel circuit may include additional components or fewer components without departing from the spirit and scope of embodiments according to the present disclosure.

Referring to FIG. 6, each of the plurality of pixels according to some embodiments of the present disclosure may include a first pixel circuit 611 configured to emit first red light and second red light, a second pixel circuit 612 configured to emit first green light and second green light, and a third pixel circuit 613 configured to emit first blue light and second blue light. In another aspect, a pixel may include six subpixels and three driving circuits.

According to some embodiments, the first pixel circuit 611, the second pixel circuit 612, and the third pixel circuit 613 may share a portion of an additional circuit.

As shown in FIG. 6, each pixel circuit may include a first transistor T9 and a second transistor T10, and a third transistor T11 and a first capacitor $C_{sel}$ may be configured as a separate additional circuit 620 to be connected to each pixel circuit. In another aspect, each of the pixel circuits may share an additional circuit of 1T1C.

According to some embodiments, two transistors and two capacitors may not be used compared to the case where each pixel circuit includes a selection circuit.

Referring to FIG. 7, each of the plurality of pixels according to some embodiments of the present disclosure may include a first subpixel circuit 711 configured to emit red light, a second subpixel circuit 712 configured to emit green light, and a third pixel circuit 713 configured to emit first blue light and second blue light. In another aspect, a pixel may include four subpixels and three driving circuits.

As shown in FIG. 7, only the third pixel circuit 713 may include the selection circuit according to some embodiments of the present disclosure. According to some embodiments, by implementing a selection circuit for a pixel circuit configured to emit blue light having low luminous efficiency, the luminous efficiency may be increased to relatively reduce the power consumption, and elements used in the configuration of the selection circuit may be relatively reduced. However, the selection circuit is not limited to that shown in FIG. 7, and the selection circuit may be implemented in a red emitting pixel circuit or in a green emitting pixel circuit, and may also be implemented in any two pixel circuits of the first to third pixel circuits. In this case, some embodiments may be applied in which the two pixel circuits in which the selection circuit is implemented share a portion of the selection circuit described above with reference to FIG. 6.

Figure 8:
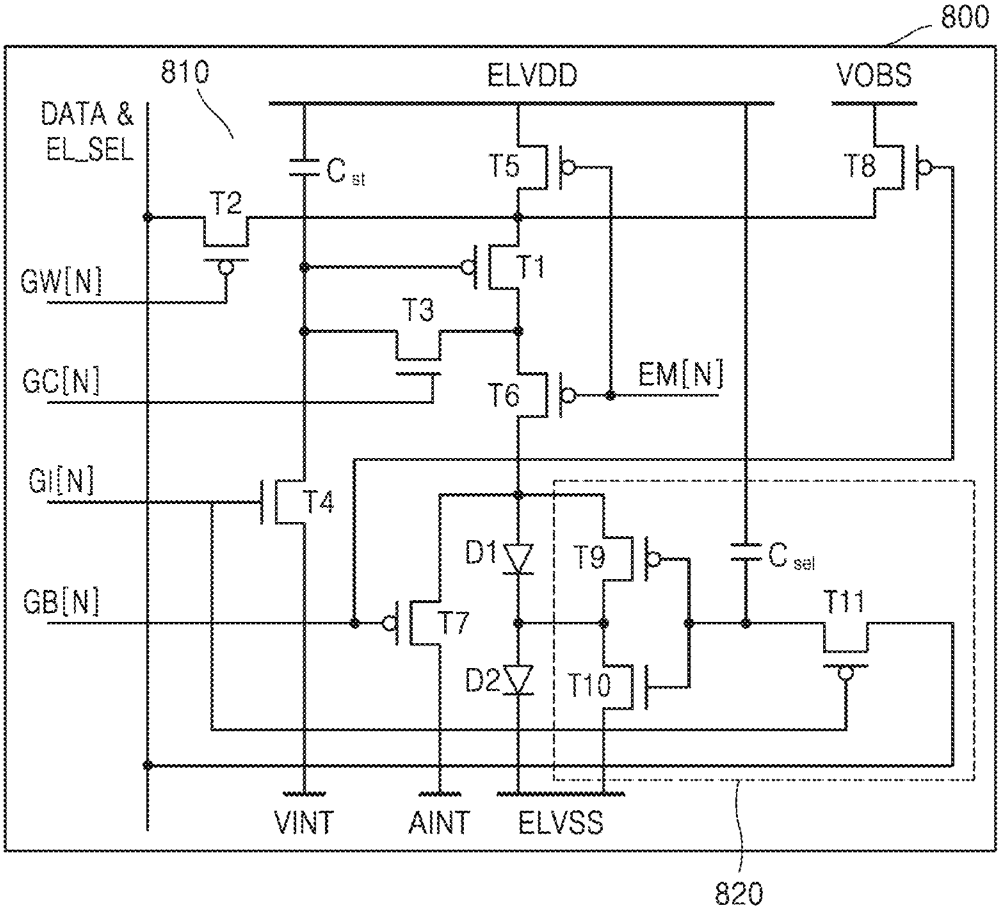
FIG. 8 is a circuit diagram showing a pixel circuit according to some embodiments of the present disclosure.

FIG. 8 is a circuit diagram showing a pixel circuit according to some embodiments of the present disclosure. Although FIG. 8 illustrates various components in a pixel circuit according to some embodiments, embodiments according to the present disclosure are not limited thereto, and according to various embodiments, the pixel circuit may include additional components or fewer components without departing from the spirit and scope of embodiments according to the present disclosure.

Referring to FIG. 8, a pixel circuit 800 according to some embodiments of the present disclosure may include a first circuit 810 and a second circuit 820.

Referring to FIG. 8, the first circuit 810 is shown to be implemented as the same as the first circuit 310 described above with reference to FIG. 3. Therefore, repeated description will be omitted. Similarly, the first circuit 810 of the pixel circuit 800 is not limited to that shown in FIG. 8, and a pixel circuit configured to drive a display device using organic light-emitting diodes may be included in the first circuit 810 if the pixel circuit includes a light-emitting element configured to emit a first color and a light-emitting element configured to emit a second color.

Referring to FIG. 8, the second circuit 820 may include a first transistor T9, a second transistor T10, a third transistor T11, and a first capacitor $C_{sel}$. The first transistor T9, the second transistor T10, and the first capacitor $C_{sel}$ are the same as the components of the second circuit 320 described above with reference to FIG. 3, and therefore repeated description thereof will be omitted.

Referring to FIG. 8, the third transistor T11 according to some embodiments may include a gate electrode configured to receive a first gate signal GI and a first electrode configured to receive a select signal EL_SEL.

According to some embodiments, the third transistor T11 may receive the selection signal EL_SEL from the same line as the data signal DATA. According to some embodiments, the data driver 30 described above with reference to FIG. 1 may transfer the selection signal EL_SEL and the data signal DATA to each of the plurality of pixels. According to some embodiments, the selection signal EL_SEL and the data signal DATA may be received through a single line (e.g., the data line), thereby relatively reducing the number of IC channels.

According to some embodiments, the third transistor T11 may receive the selection signal EL_SEL and the data signal DATA in a time-sharing manner within a single frame. According to some embodiments, the third transistor T11 may receive the select signal EL_SEL before the data signal DATA. In another aspect, in all the signals supplied to the third transistor T11 through a single line (e.g., the data line), the region in which the selection signal EL_SEL is transmitted may be a region before the region in which the data signal DATA is transmitted.

According to some embodiments, to prevent or relatively reduce repeated reception of the select signal EL_SEL and the data signal DATA received through a single line, the transistor configured to receive the select signal EL_SEL and the transistor configured to receive the data signal DATA may be controlled based on different gate signals. According to some embodiments, the gate electrode of the third transistor T11 configured to receive the select signal EL_SEL may receive a first gate signal GI, and the gate electrode of the data write transistor T2 configured to receive the data signal DATA may receive a second gate signal GW. According to some embodiments, the gate electrode of the third transistor T11 may be implemented to receive a third gate signal GC or a fourth gate signal GB in addition to the first gate signal GI, but not the second gate signal GW. Based on which gate signal the gate electrode of the third transistor T11 receives and how the received gate signal is controlled, the third transistor T11 may be implemented as a PMOS transistor or an NMOS transistor. According to some embodiments, as will be described later, the third transistor T11 controlled based on the first gate signal GI may be implemented as an NMOS transistor.

Figure 9:
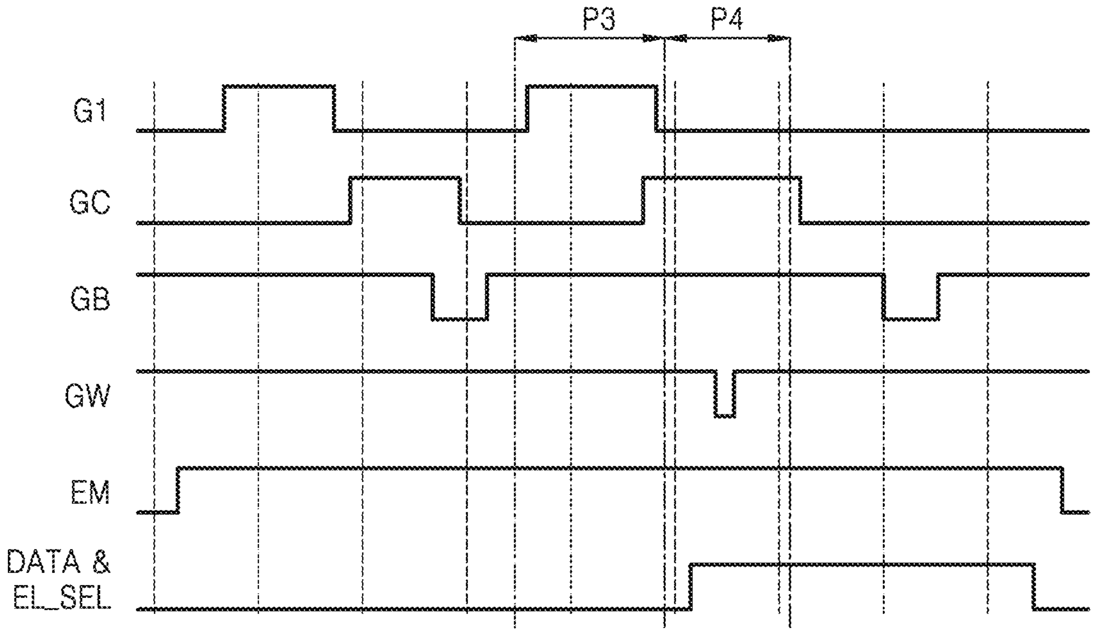
FIG. 9 is a timing diagram showing an example of input signals applied to the pixel circuit of FIG. 8.
Figure 10:
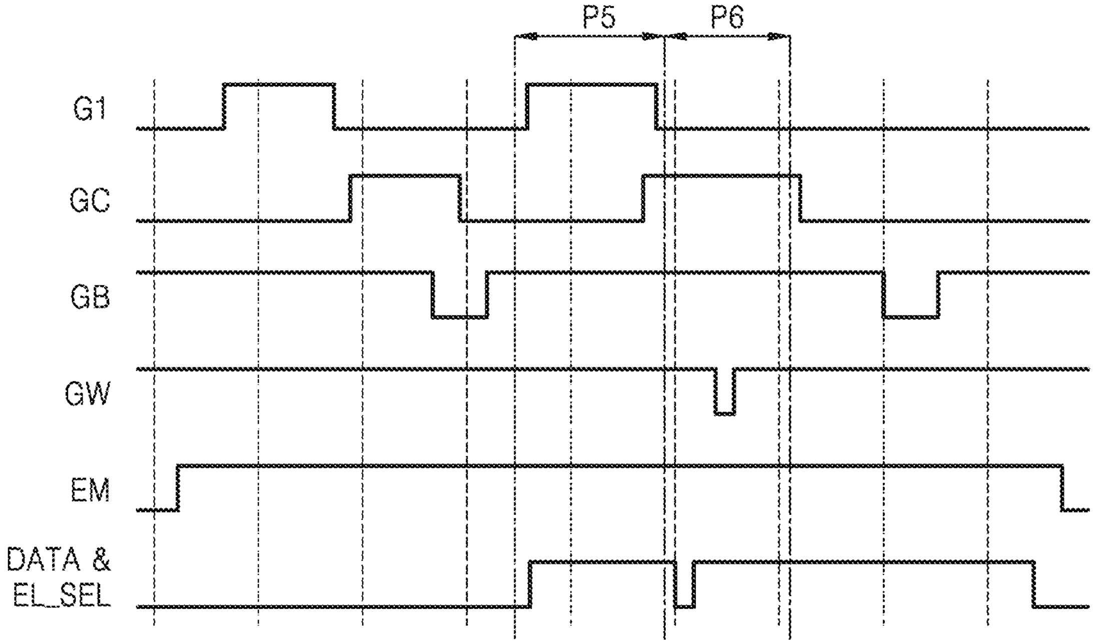
FIG. 10 is a timing diagram showing another example of input signals applied to the pixel circuit of FIG. 8.

FIG. 9 is a timing diagram showing an example of input signals applied to the pixel circuit of FIG. 8, and FIG. 10 is a timing diagram showing another example of input signals applied to the pixel circuit of FIG. 8.

In the following, the pixel circuit controlled in accordance with input signals shown in the timing diagram of FIG. 9 or the timing diagram of FIG. 10 will be described assuming that the first transistor T9 is implemented as a PMOS transistor, the second transistor T10 is implemented as an NMOS transistor, and the third transistor T11 is implemented as an NMOS transistor as shown in FIG. 8.

Referring to FIG. 9, in a first period P3, the first gate signal GI is shown as a high signal, the second gate signal GW is shown as a high signal, and a data and selection signal DATA&EL_SEL is shown as a low signal. Based on the first gate signal GI being a high signal, the third transistor T11 may be turned on, and based on the second gate signal GW being a high signal, the data write transistor T2 may be turned off. Based on the third transistor T11 being turned on, the data and selection signal DATA&EL_SEL may be transferred to the third node. In another aspect, a signal transferred through a data line in the first period P3 may be the selection signal EL_SEL, and the first period P3 may be referred to as the selection period.

According to some embodiments, because the selection signal EL_SEL transferred to the third node is a low signal, the first transistor T9 implemented as a PMOS transistor may be turned on, and the second transistor T10 implemented as an NMOS transistor may be turned off. That is, the second light-emitting element D2 may be selected to emit light in the selection period.

Thereafter, in a second period P4, the first gate signal GI is shown as a low signal, the second gate signal GW is shown as a low signal, and the data and selection signal DATA&EL_SEL is shown as a high signal. Based on the first gate signal GI being a low signal, the third transistor T11 may be turned off, and based on the second gate signal GW being a low signal, the data write transistor T2 may be turned on. Based on the third transistor T11 being turned off, the data and selection signal DATA&EL_SEL may not be transferred to the third node. According to some embodiments, based on the data write transistor T2 being turned on, the data and selection signal DATA&EL_SEL may be transferred to the driving transistor T1 through the data write transistor T2. In another aspect, the signal transferred through the data line in the second period P4 may be the data signal DATA, and the second period P4 may be referred to as the data write period.

According to some embodiments, in a subsequent light-emitting period, in response to the first transistor T9 being turned on, a driving current supplied to the first node may flow to the first transistor T9 rather than the first light-emitting element D1. In response to the second transistor T10 being turned off, the driving current supplied to the second node may flow to the second light-emitting element D2. That is, in the light-emitting period, the second light-emitting element D2 may emit light based on the driving current. In another aspect, the timing diagram of the input signal shown in FIG. 9 may be an example of a signal flow controlling the second light-emitting element D2 to emit light.

Referring to FIG. 10, in a first period P5, the first gate signal GI is shown as a high signal, the second gate signal GW is shown as a high signal, and the data and selection signal DATA&EL_SEL is shown as a high signal. Based on the first gate signal GI being a high signal, the third transistor T11 may be turned on, and based on the second gate signal GW being a high signal, the data write transistor T2 may be turned off. Based on the third transistor T11 being turned on, the data and selection signal DATA&EL_SEL may be transferred to the third node. In another aspect, the signal transferred through the data line in the first period P5 may be the selection signal EL_SEL, and the first period P5 may be referred to as the selection period.

According to some embodiments, because the selection signal EL_SEL transmitted to the third node is a high signal, the first transistor T9 implemented as a PMOS transistor may be turned off, and the second transistor T10 implemented as an NMOS transistor may be turned on. That is, the first light-emitting element D1 may be selected to emit light in the selection period.

Thereafter, in a second period P6, the first gate signal GI is shown as a low signal, the second gate signal GW is shown as a low signal, and the data and selection signal DATA&EL_SEL is shown as a high signal. Based on the first gate signal GI being a low signal, the third transistor T11 may be turned off, and based on the second gate signal GW being a low signal, the data write transistor T2 may be turned on. Based on the third transistor T11 being turned off, the data and selection signal DATA&EL_SEL may not be transferred to the third node. According to some embodiments, based on the data write transistor T2 being turned on, the data and selection signal DATA&EL_SEL may be transferred to the driving transistor T1 through the data write transistor T2. In another aspect, the signal transferred through the data line in the second period P6 may be the data signal DATA, and the second period P6 may be referred to as the data write period.

According to some embodiments, in a subsequent light-emitting period, in response to the first transistor T9 being turned off, the driving current supplied to the first node may flow to the first light-emitting element D1. In response to the second transistor T10 being turned on, the driving current supplied to the second node may flow to the second transistor T10 rather than the second light-emitting element D2. That is, in the light-emitting period, the first light-emitting element D1 may emit light based on the driving current. In another aspect, the timing diagram of the input signal shown in FIG. 10 may be an example of a signal flow controlling the first light-emitting element D1 to emit light.

The respective embodiments described above are embodiments that may be practiced independently, the structure of each of the embodiments may be applied in combination with other embodiments.

The present disclosure has been described as above with reference to the embodiments shown in the drawings, which are examples only, and a person having ordinary knowledge in the art will appreciate that various modifications and variations of the embodiments are possible. Accordingly, the true scope and spirit of the present disclosure shall be defined only by the appended claims.

The particular implementations shown and described in the embodiments are examples and are not intended to limit the scope of the embodiments in any manner. Furthermore, a component may not be essential to the practice of the present disclosure unless the element is specifically described as "essential" or "critical".

The use of the term "the" and similar reference terms in the context of describing the embodiments (particularly in the claims) are to be construed to cover both the singular and the plural. Furthermore, the specification of a range herein includes inventions in which individual values within the range are applied (unless otherwise stated), as if each individual value within the range were specified in the detailed description. Finally, the operations of the method according to the present disclosure may be performed in any appropriate order, unless the order of the operations is explicitly stated or otherwise. The present disclosure is not necessarily limited to the order in which the operations are described. The use of any examples or illustrative terms herein is only for the purpose of describing the embodiments in detail and the scope of the embodiments is not limited to the examples or illustrative terms unless defined by the claims. Furthermore, a person having ordinary knowledge in the art will appreciate that various modifications, combinations, and alterations are possible depending on the design conditions and factors within the scope of the appended claims or equivalents thereof.

In the pixel circuit according to some embodiments of the present disclosure, both the light-emitting element configured to emit a color having high color purity and the light-emitting element configured to emit a color having high luminous efficiency may be controlled at the same time.

The pixel circuit according to some embodiments of the present disclosure may include a pixel driving circuit configured to control a plurality of subpixels, thereby relatively reducing the space required for circuit configuration.

The pixel circuit according to some embodiments of the present disclosure may include a data signal and a selection signal transferred through a data line, thereby relatively reducing the number of IC channels required.

However, the effects of the present disclosure are not limited to the effects described above, and may be extended in various manners without departing from the spirit and scope of embodiments according to the present disclosure.

What is claimed is:

1. A pixel circuit comprising:

a first circuit comprising a first light-emitting element, a second light-emitting element, one or more transistors comprising a driving transistor, and one or more capacitors; and a second circuit comprising a first transistor, a second transistor, a third transistor, and a first capacitor, wherein the first light-emitting element comprises a first electrode connected to the driving transistor at a first node and a second electrode connected to a second node, the second light-emitting element comprises a first electrode connected to the second node and a second electrode configured to receive a first supply voltage, and the second circuit comprises:

the first transistor comprising a gate electrode connected to a third node, a first electrode connected to the first node, and a second electrode connected to the second node;

the second transistor comprising a gate electrode connected to the third node, a first electrode connected to the second node, and a second electrode configured to receive the first supply voltage;

the third transistor comprising a gate electrode configured to receive a first gate signal, a first electrode configured to receive a selection signal, and a second electrode connected to the third node; and the first capacitor comprising a first electrode configured to receive a second supply voltage and a second electrode connected to the third node.

2. The pixel circuit of claim 1, wherein the third transistor is configured to transfer the selection signal to at least one of the first transistor and the second transistor based on being turned on.

3. The pixel circuit of claim 1, wherein of the first transistor and the second transistor, at least a first one is a P-channel metal oxide semiconductor (PMOS) transistor, and at least a second one is an N-channel metal oxide semiconductor (NMOS) transistor.

4. The pixel circuit of claim 1, wherein the first capacitor is configured to receive the selection signal based on the third transistor being turned on and to store the selection signal for a single frame.

5. The pixel circuit of claim 1, wherein the first light-emitting element is configured to emit light based on the first transistor being turned off.

6. The pixel circuit of claim 1, wherein the second light-emitting element is configured to emit light based on the second transistor being turned off.

7. The pixel circuit of claim 1, wherein the third transistor is configured to receive the selection signal from a same line as a data signal.

8. The pixel circuit of claim 7, wherein the third transistor is configured to receive the selection signal before the data signal.

9. The pixel circuit of claim 7, wherein the third transistor is configured to be turned off based on the first gate signal when receiving the data signal.

10. The pixel circuit of claim 9, wherein a data write transistor is included in the first circuit, is configured to receive the data signal, and further includes a gate electrode configured to receive a second gate signal.

11. A display device comprising:

a scan driver configured to transfer a plurality of scan signals to a plurality of scan lines;

a data driver configured to transfer a plurality of data signals to a plurality of data lines;

a display comprising a plurality of pixels each connected to a corresponding scan line of the plurality of scan lines and a corresponding data line of the plurality of data lines, and configured to display an image with each of the plurality of pixels being configured to emit light in accordance with a corresponding data signal; and a controller configured to control the scan driver and the data driver, to generate the plurality of data signals, and to supply the plurality of data signals to the data driver, wherein each of the plurality of pixels comprises:

a first circuit comprising a first light-emitting element, a second light-emitting element, one or more transistors comprising a driving transistor, and one or more capacitors; and a second circuit comprising a first transistor, a second transistor, a third transistor, and a first capacitor, wherein the first light-emitting element comprises a first electrode connected to the driving transistor at a first node and a second electrode connected to a second node, the second light-emitting element comprises a first electrode connected to the second node and a second electrode configured to receive a first supply voltage, and the second circuit comprises:

the first transistor comprising a gate electrode connected to a third node, a first electrode connected to the first node, and a second electrode connected to the second node;

the second transistor comprising a gate electrode connected to the third node, a first electrode connected to the second node, and a second electrode configured to receive the first supply voltage;

the third transistor comprising a gate electrode configured to receive a first gate signal, a first electrode configured to receive a selection signal, and a second electrode connected to the third node; and a first capacitor comprising a first electrode configured to receive a second supply voltage and a second electrode connected to the third node.

12. The display device of claim 11, wherein the third transistor transfers the selection signal to at least one of the first transistor and the second transistor based on being turned on.

13. The display device of claim 11, wherein of the first transistor and the second transistor, at least a first one is a P-channel metal oxide semiconductor (PMOS) transistor, and at least a second one is an N-channel metal oxide semiconductor (NMOS) transistor.

14. The display device of claim 11, wherein the first capacitor is configured to receive the selection signal based on the third transistor being turned on and to store the selection signal for a single frame.

15. The display device of claim 11, wherein the first light-emitting element is configured to emit light based on the first transistor being turned off.

16. The display device of claim 11, wherein the second light-emitting element is configured to emit light based on the second transistor being turned off.

17. The display device of claim 11, wherein the third transistor is configured to receive the selection signal from a same line as a data signal.

18. The display device of claim 17, wherein the third transistor is configured to receive the selection signal before the data signal, and the third transistor is configured to be turned off based on the first gate signal when receiving the data signal.

19. The display device of claim 18, wherein a data write transistor is included in the first circuit, is configured to receive the data signal, and further includes a gate electrode configured to receive a second gate signal.

20. An electronic device comprising:

a display device comprising:

a scan driver configured to transfer a plurality of scan signals to a plurality of scan lines;

a data driver configured to transfer a plurality of data signals to a plurality of data lines;

a display comprising a plurality of pixels each connected to a corresponding scan line of the plurality of scan lines and a corresponding data line of the plurality of data lines, and configured to display an image with each of the plurality of pixels being configured to emit light in accordance with a corresponding data signal; and a controller configured to control the scan driver and the data driver, to generate the plurality of data signals, and to supply the plurality of data signals to the data driver, wherein each of the plurality of pixels comprises:

a first circuit comprising a first light-emitting element, a second light-emitting element, one or more transistors comprising a driving transistor, and one or more capacitors; and a second circuit comprising a first transistor, a second transistor, a third transistor, and a first capacitor, wherein the first light-emitting element comprises a first electrode connected to the driving transistor at a first node and a second electrode connected to a second node, the second light-emitting element comprises a first electrode connected to the second node and a second electrode configured to receive a first supply voltage, and the second circuit comprises:

the first transistor comprising a gate electrode connected to a third node, a first electrode connected to the first node, and a second electrode connected to the second node;

the second transistor comprising a gate electrode connected to the third node, a first electrode connected to the second node, and a second electrode configured to receive the first supply voltage;

the third transistor comprising a gate electrode configured to receive a first gate signal, a first electrode configured to receive a selection signal, and a second electrode connected to the third node; and a first capacitor comprising a first electrode configured to receive a second supply voltage and a second electrode connected to the third node.

* * * * *